United States Patent [19]

Rapaich

[11] Patent Number: 4,611,343

[45] Date of Patent: Sep. 9, 1986

[54] AUDIO SPECTRUM ANALYZER OPERABLE IN A DIFFERENCE MODE

[75] Inventor: Mark Rapaich, Stevensville, Mich.

[73] Assignee: Heath Company, Benton Harbor, Mich.

[21] Appl. No.: 625,940

[22] Filed: Jun. 29, 1984

[51] Int. Cl.$^4$ .............................................. H03G 5/00
[52] U.S. Cl. .................................. 381/103; 324/77 B
[58] Field of Search ................. 324/77 B, 77 A, 77 E; 381/98, 103; 364/484, 485

[56] References Cited

U.S. PATENT DOCUMENTS

| | | | |
|---|---|---|---|
| 4,067,060 | 1/1978 | Poussart et al. | 324/77 B |
| 4,339,711 | 7/1982 | Inami et al. | 324/77 B |
| 4,421,949 | 12/1983 | Eberbach | 381/98 |
| 4,458,362 | 7/1984 | Berkovitz et al. | 381/103 |

Primary Examiner—Forester W. Isen

[57] ABSTRACT

A real-time, microprocessor-controlled, ½-octave audio spectrum analyzer is capable of operating in a difference mode wherein a current input may be compared with a previously stored input and the difference therebetween directly displayed in real time. A reference response may be displayed and stored in memory for later comparison with another audio signal for which a spectrum analysis is desired. For example, if an output from a pink noise generator is stored as the reference spectrum and the output from a speaker is the audio signal to be measured, the difference mode of operation will subtract the frequency response of the speaker from that of the noise generator and display the difference. Thus, it is not necessary to take into account frequency response errors of the reference signal source in making highly accurate spectral comparisons.

7 Claims, 5 Drawing Figures

AUDIO SPECTRUM ANALYZER OPERABLE IN A DIFFERENCE MODE

CROSS-REFERENCE TO RELATED APPLICATION

This application is related to but in no way dependent upon the following application which is assigned to the assignee of the present application: Ser. No. 623,647, filed June 22, 1984, entitled "ROM Compensated Microphone", in the name of Mark Rapaich.

BACKGROUND OF THE INVENTION

This invention relates generally to audio spectrum analyzers and is particularly directed to an audio spectrum analyzer for making real-time comparisons between a received audio signal and a reference audio signal.

A spectrum analyzer is an instrument for measuring the amplitudes of the components of a complex waveform throughout the frequency range of the waveform. Audio spectrum analyzers are used for analysis of audio signals over the frequency range of 20 Hz–20 kHz. Audio spectrum analyzers are used for such purposes as conducting sound level measurements in industrial environments, measuring the performance of a loudspeaker system, and measuring the frequency response of an audio device such as a tape recorder. There are numerous other practical applications of the use of an audio spectrum analyzer too numerous to list herein.

Frequently an audio spectrum analyzer is used to compare a received signal with a reference signal level. For example, an audio spectrum analyzer may be used in adjusting the frequency response of a tape recorder so as to be flat over the entire audio spectrum. This may be accomplished by comparing the output of the tape recorder with a pink noise reference signal which is filtered so as to provide a constant energy per octave in the form of a flat signal across the entire audio spectrum. However, inherent in all pink noise generators is random noise which instantaneously varies in amplitude and frequency over the audio spectrum. Over an extended period of time, the overall average of the pink noise signal may be flat over the audio spectrum, but over the typically short, finite period during which the frequency response of the audio apparatus is to be measured and adjusted, this variation in the reference signal would preclude accurate adjustment of the device's frequency response.

In the past, in order to obtain a visual comparison of the difference in the spectra of two audio signals, it was necessary to write down the values of the spectrum of the signal in question as presented on an audio spectrum analyzer and to manually convert these values to graphical form in order to provide a graphic comparison between the respective signal spectra. Not only was this procedure tedious, but it also failed to provide real-time spectral analysis of the audio signal. Because in many cases a real-time spectral analysis is required, prior art approaches were only of limited value in many audio spectrum analysis applications.

The present invention is intended to overcome the aforementioned limitations of the prior art by providing an audio spectrum analyzer capable of operating in a difference mode wherein information presented on a dot matrix display reflects the difference between a stored reference response and a real-time input to an audio spectrum analyzer. The present invention may be used in a wide variety of audio signal analysis applications, such as in calibrating audio signal processing apparatus to provide a flat frequency response therein.

OBJECTS OF THE INVENTION

Accordingly, it is an object of the present invention to provide a highly accurate audio spectrum analyzer.

It is another object of the present invention to provide improved means for measuring, comparing and displaying the frequency spectrum of a received audio signal relative to a reference signal independently of variations in the frequency spectrum of the reference signal.

Yet another object of the present invention is to provide an audio spectrum analyzer capable of comparing and displaying the spectrum of an audio signal relative to a reference signal on a real-time basis.

A further object of the present invention is to provide an audio spectrum analyzer capable of operating in a difference mode wherein the frequency spectrum of a received audio signal is compared in real-time with a reference audio spectrum and the results of this comparison are visually displayed.

A still further object of the present invention is to provide a microprocessor-controlled, $\frac{1}{2}$-octave, audio spectrum analyzer for comparing two inputs and directly displaying their spectral differences in real-time.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
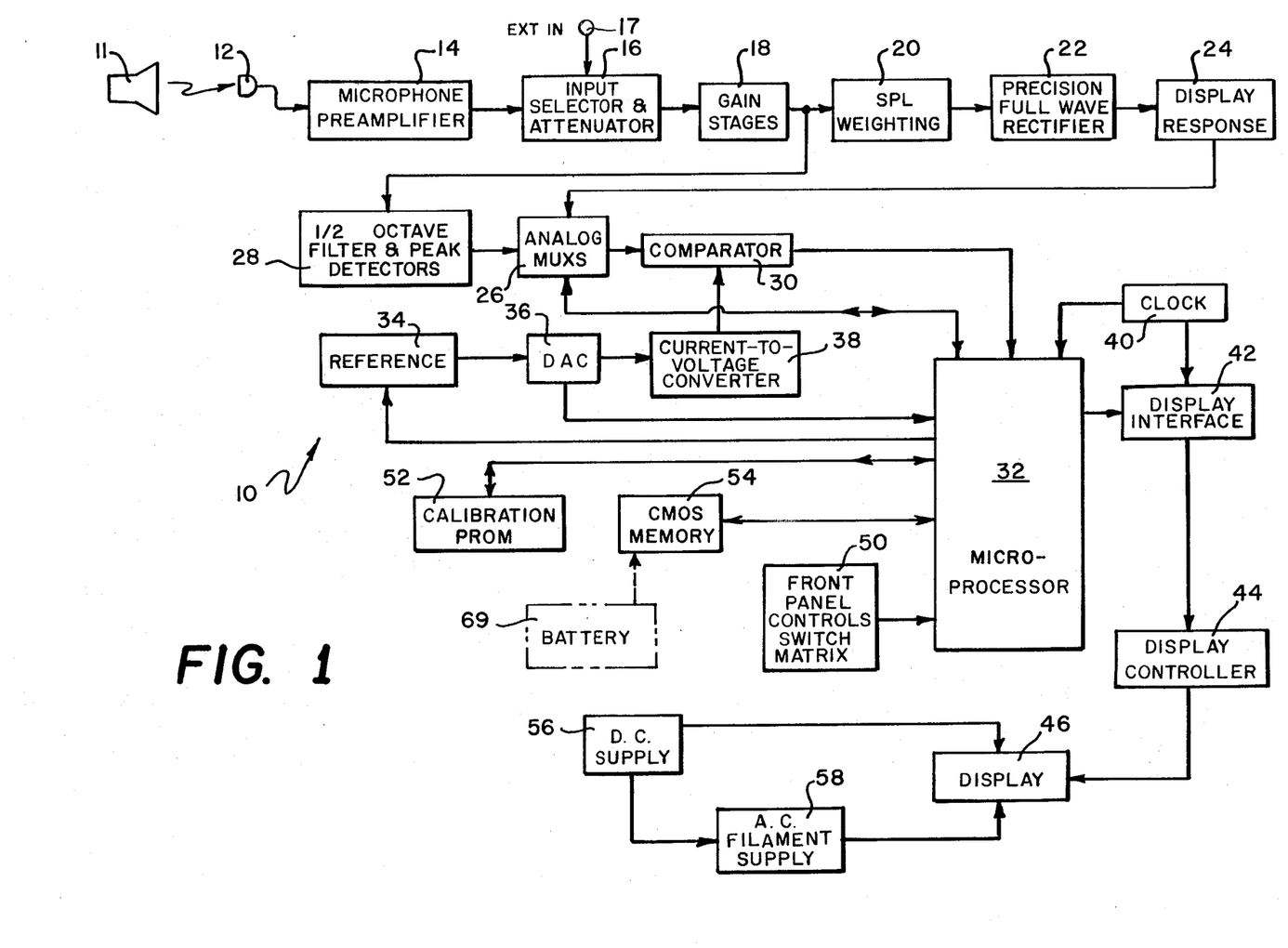
FIG. 1 is a simplified block diagram of an audio spectrum analyzer operable in a difference mode in accordance with the present invention.

Referring to FIG. 1, there is shown in simplified block diagram form an audio spectrum analyzer 10 capable of operating in a difference mode in accordance with the present invention.

A sound source 11, such as a speaker, transmits an audio signal which is received by a microphone 12. Virtually any conventional microphone may be used in the audio spectrum analyzer 10. Although not shown in FIG. 1 for simplicity sake, the microphone 12 as well as various other components of the audio spectrum analyzer 10 are understood to be coupled to the DC power supply 56 shown in the figure as is well known to those skilled in the art. The output of the microphone 12 is provided through a low-noise preamplifier circuit 14, the gain and the calibration of which is set by a selected resistor (not shown) in a conventional manner. The microphone preamplifier 14 adjusts the gain of the audio spectrum analyzer 10 to correct for variations in microphone sensitivity which might cause errors in sound pressure level (SPL) indications discussed below.

An input selector and attenuator 16 is switchably coupled to either the microphone amplifier 14 for receiving the amplified output therefrom or to an external input connector 17 for directly receiving an audio signal input. This latter arrangement may be desirable when the performance of the microphone 12 varies over one or more parameters, e.g., frequency, amplitude, etc., and it is desired to eliminate this source of measurement inaccuracy. A co-pending application cited above and entitled "ROM Compensated Microphone", the disclosure of which is hereby incorporated by reference, is directed to an arrangement for compensating for the microphone's non-linear frequency response characteristic. The input selector and attenuator 16 permits the sensitivity of the audio spectrum analyzer 10 to be adjusted in 10 dB steps up or down.

The output of the selector and attenuator 16 is provided to a plurality of gain stages 18 which amplify the received audio signal to the levels necessary for its proper display. The gain of each of the gain stages 18 is selected to ensure that the bandwidth error at 20 kHz is less than 0.2 dB in the worst case combination of component tolerances. At the output of the gain stages 18 is a low-pass filter (not shown) for providing a filtered output to an SPL weighting circuit 20 and to ½ octave filter and peak detector circuits 28.

The SPL weighting circuit 20 provides two selectable weighting functions as defined by the American National Standards Institute (ANSI) standard SI.4-1971 (rev. 1976). A-weighting and C-weighting functions are performed by the SPL weighting circuit 20. A-weighting is intended to match the response of an SPL meter to the human ear at a level of 40 phons for use at levels between 30 to 70 dBSPL. C-weighting is intended to match the human ear at a level of 90 phons for use at levels above 70 dBSPL. A low impedance output is provided from the SPL weighting circuit to a precision full wave rectifier 22 to ensure asymmetrical waveform measurement accuracy. The output from the full wave rectifier circuit 22 is provided to a display response circuit 24 which includes two filter circuits with different response time constants and a peak detector circuit (not shown). The response time constants of the fast and slow filter circuits are selected to meet the requirements of ANSI specifications for sound level meters (SI.3-1971). Both characteristics are implemented by simple RC filters and their outputs are provided to an SPL response switch (not shown), the output of which is provided to three analog multiplexers 26 which are used to switch the desired DC voltage from the SPL, or the filter outputs, to the comparator 30 which is the input to an analog-to-digital converter.

The output of the gain stages is not only provided to the SPL weighting circuit 20, but is also provided to a plurality of ½-octave filter and peak detector circuits 28 as stated above. The basic ½-octave filter and peak detector circuits 28 are identical for each band except for the values of the frequency-determining resistors and capacitors (not shown) which are selected to yield maximum gain at the center frequency in each of the designated bands. In a preferred embodiment, twenty ½-octave filter and peak detector circuits are provided to cover the entire audio spectrum. The center frequencies of each of these filter and peak detector combinations in a preferred embodiment are shown in Table I.

TABLE I

| |
|---|
| 31.5 Hz |
| 45.0 Hz |
| 63.0 Hz |
| 90.0 Hz |
| 125.0 Hz |
| 355.0 Hz |
| 710.0 Hz |
| 1.0 kHz |
| 1.4 kHz |
| 2.0 kHz |
| 2.8 kHz |
| 4.0 kHz |
| 5.6 kHz |
| 8.0 kHz |
| 11.5 kHz |
| 16.0 kHz |
| 20.0 kHz |

The outputs from the ½-octave filter and peak detectors 28 are provided to three analog multiplexers 26 which are used to switch the desired DC voltage from the SPL, or the filter outputs, to comparator 30 under the control of a microprocessor 32 as described below. The DC voltages representing the analyzed audio signals to be displayed must first be converted to digital numbers in order to permit the microprocessor 32 to convert them to a readable display value. This conversion is accomplished by an 8-bit digital-to-analog converter (DAC) 36 in generating a DC voltage which is under the control of the microprocessor 32. This voltage is compared to the input DC level and the microprocessor 32 is signaled by the comparator 30 when the level is matched. A reference circuit 34 under the control of the microprocessor 32 sources reference currents to the DAC 36. In one embodiment, the voltage for the reference circuit 34 is obtained from the DC power supply 56, the output of which is divided down by means of a resistive network (not shown). The 8-bit DAC 36 thus provides a reference DC current which is under the control of the microprocessor to a current-to-voltage converter circuit 38 in response to the reference current output from the reference circuit 34. The reference current output from the reference circuit 34 is under the control of the microprocessor 32 and represents a reference signal spectrum stored therein. The output current from the DAC 36 must be converted to a voltage in order to permit the comparator 30 to compare it to the input voltage from the analog multiplexers 26. This is accomplished by means of the current-to-voltage converter circuit 38 coupled between the DAC 36 and the comparator 30.

The comparator 30 is a high speed comparator which compares the received audio signal from the analog multiplexers 26 with the output voltage from the DAC 36. When the output voltage from the DAC 36 exceeds the input voltage from the analog multiplexers 26, the output of the comparator 30 goes high. The output of the comparator 30 is monitored by the microprocessor 32 to determine the progress of a conversion. The comparator 30 thus compares the voltage state of one of the filter and peak detectors 28 and the microprocessor 32 changes the output voltage of the DAC 36 until it is equal to the input voltage to the comparator 30 from the filter and peak detectors 28. When this occurs, the microprocessor 32 establishes the input voltage to the comparator 30 which represents the received audio signal within a given band as determined by the output of the ½-octave filter and peak detectors 28.

Digital circuitry within the audio spectrum analyzer 10 is comprised primarily of the microprocessor 32, a clock 40, a calibration programmable read only memory (PROM) 52, a complementary-metal- oxide-silicon (CMOS) random access memory (RAM) 54, and a display interface 42. In a preferred embodiment, the clock 40 provides a 3.5 MHz square wave to the microprocessor 32 and to the display interface 42. The clock 40 is comprised of an oscillator circuit having a duty cycle established by two RC timing networks (not shown). The display interface 42 accepts data from the microprocessor 32 in the form of 8-bit words (or bytes) and converts these to the serial data and synchronized clock signals required by a display controller 44. The display interface 42 includes an 8-bit parallel-to-serial converter as well as a counter for controlling a shift register in generating a synchronized clock signal for the display controller 44. The display controller 44 receives this serial data from the output of the shift register within the display interface 42 and a clock signal from its counter output. The display controller 44 provides serial data as well as timing signals to the display 46. In a preferred embodiment, the display 46 is a vacuum fluorescent dot matrix which operates much like a cathode ray tube (CRT). A hot wire filament emits a beam of electrons which is accelerated by a positive potential toward a phosphorous screen in the form of a plurality of dots which emit visible light when struck by the electron beam. It is in this manner that video information representing the difference spectrum of the audio signals received by the microphone 12 is visually displayed by the audio spectrum analyzer 10 of the present invention. The display 46 is energized by the DC supply 56 as well as an AC filament power supply 58.

The calibration PROM 52 is coupled to the microprocessor 32 and is programmed in accordance with the inverse, or complementary, frequency response characteristic of the microphone 12. The microphone 12 and calibration PROM 52 are a matched pair and are calibrated as a unit prior to incorporation in the audio spectrum analyzer 10 as described in the aforementioned related patent application. Once calibrated as a unit, the microphone 12 and the calibration PROM 52 become an inseparable pair in an integrated unit. The calibration PROM 52 is programmed to provide a frequency response which is precisely complementary to the response of the microphone 12 such that when the two are combined, the result is a flat response across the entire audio spectrum. The microprocessor 32 reads the information thus programmed into the calibration PROM 52 and stores this information in the CMOS memory 54 to be used when necessary. Because the CMOS memory 54 requires only a small portion of the current needed for operation of the calibration PROM 52, during normal operation the programmed information required for proper calibration of the microphone 12 within each of the bands shown in Table I is provided from the CMOS 54 to the microprocessor 32. Power to the CMOS memory, as well as to the various other components of the audio spectrum analyzer 10, is provided by the DC power supply 56. Where the audio spectrum analyzer 10 is contemplated for use in a portable audio signal processing device such as a portable audio spectrum analyzer, the DC power supply 56 may be in the form of a battery 69 (shown in dotted line form in FIG. 1) with appropriate electronic voltage regulators for energizing the various components of the audio spectrum analyzer 10.

The microprocessor 32 determines whether the CMOS memory 54 contains valid data, or any data at all, by reading the contents thereof. When the microprocessor 32 needs to read the contents of the calibration PROM 52 such as for the initial programming of the CMOS memory 54 or when the CMOS memory does not contain valid calibration data, the microprocessor 32 provides an output voltage for energizing the calibration PROM 52. With the calibration PROM 52 thus energized, the microprocessor 32 then reads the calibration data stored therein. Once the microprocessor 32 is provided with the microphone calibration data either from the CMOS memory 54 during normal operation or from the calibration PROM 52 when the CMOS memory does not contain valid data, the microprocessor 32 provides an appropriate output to the reference circuit 34 for controlling the DAC 36 to permit the microprocessor 32 to determine the received signal level representing the received audio signal spectrum from comparator 30. If the CMOS memory 54 does not contain valid microphone calibration data, the microprocessor 32 will read the correct calibration data from the calibration PROM 52 and store this information in the CMOS memory 54 for subsequent use.

Figures 2, 3:
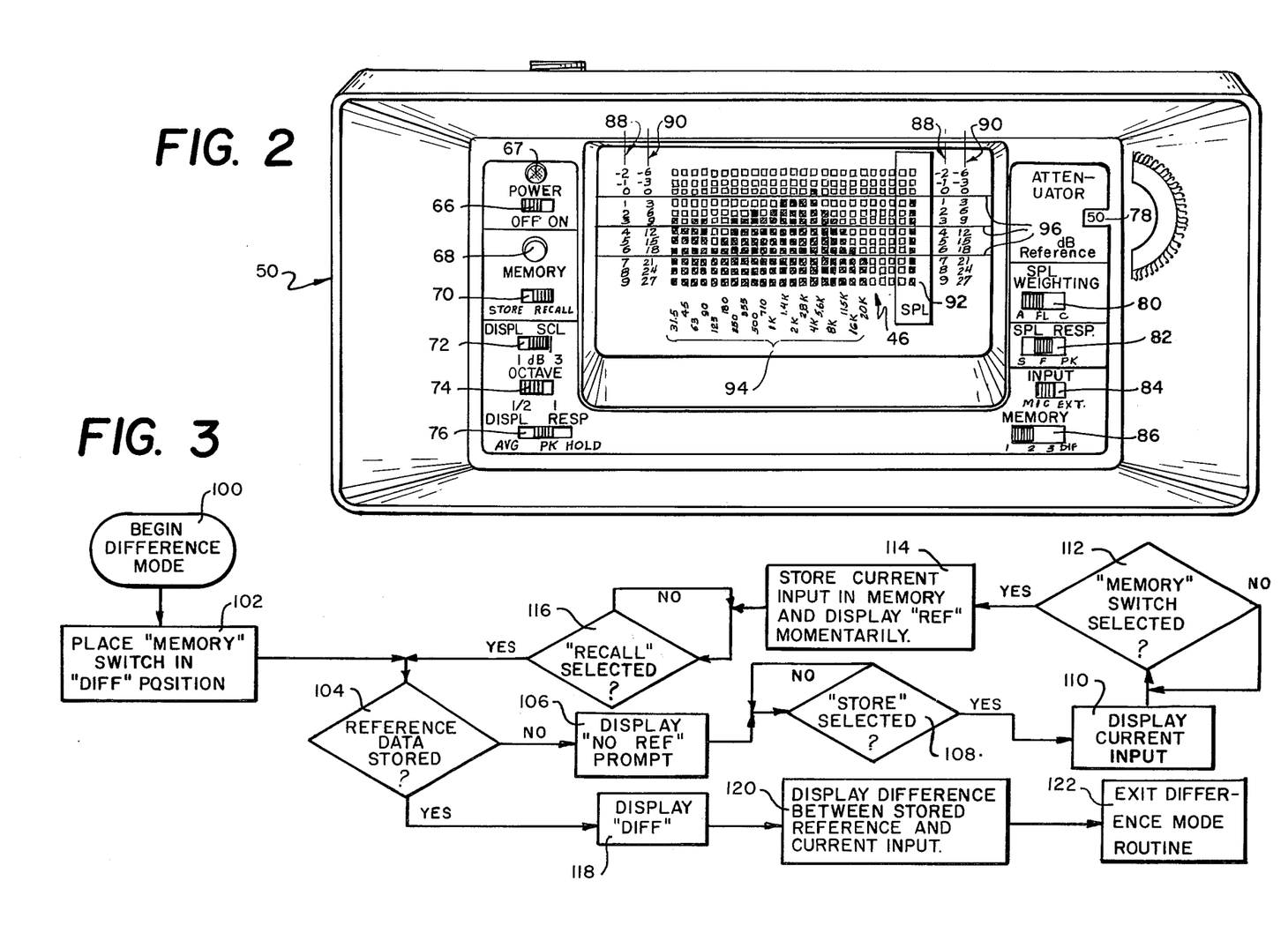
FIG. 2 illustrates a control panel for use in the audio spectrum analyzer of FIG. 1.
FIGS. 3, 4 and 5 are flow charts illustrating the sequence of operations carried out by a microprocessor in executing various functions in the audio spectrum analyzer of the present invention.

Referring to FIG. 2, there is shown a front panel control switch matrix 50 for use in the audio spectrum analyzer of the present invention. In a preferred embodiment, the front panel control switch matrix 50 includes the display 46 upon which is presented the real-time comparison data between a received audio signal and spectral data stored within the CMOS memory 54 as described below. A POWER switch 66 connects and disconnects the DC power supply 56 from the various components of the audio spectrum analyzer 10. A POWER LED (light emitting diode) 67 is illuminated whenever the audio spectrum analyzer is on. Any data stored in the CMOS memory 54 will not be lost when the power is turned off unless the battery 69 coupled thereto is disconnected or discharged.

A MEMORY switch 68 controls the movement of display data in and out of the microprocessor 32 and the CMOS memory 54. The CMOS memory 54 is used to not only store microphone calibration data, as described above, but also to store the reference audio spectrum to which the current audio spectrum analyzer input is compared. A STORE-RECALL switch 70 determines if the displayed information is to be stored in or recalled from the CMOS memory 54. When the MEMORY switch 68 is selected with the STORE-RECALL switch 70 in the "store" position, the displayed contents will be stored in the CMOS memory 54. If the MEMORY switch 68 is selected with the STORE-RECALL switch 70 in the "recall" position, a stored display will be recalled and presented upon the display 46 as a row of dots. Selection of the MEMORY switch 68 again will result in the display of the recalled information as an SPL bar graph 92 on the righthand portion of display 46.

A DISPLAY SCALE switch 72 permits the desired scale to be selected on the display 46. These scales are illustrated as a 1 dB scale 88 and a 3 dB scale 90 located on either side of the display 46. With the 1 dB scale 88 selected, the display 46 has a range of 11 dB, while with the 3 dB scale 90 selected, the display 46 has a range of 33 dB.

An OCTAVE switch 74 provides for the selection between a normal ½-octave mode and a 1-octave mode wherein every other center frequency band indicator 94 is illuminated starting with the 31.5 Hz marker. With the OCTAVE switch 74 in the 1-octave position, the audio spectrum analyzer mathematically combines the information from the ½-octave filter and peak detectors 28 to generate a 1-octave response for display at 1-octave center frequencies.

A three-position DISPLAY RESPONSE switch 76 controls the video display characteristics and provides for: a peak mode wherein peak values are displayed and allowed to decay at a selected rate permitting a viewer to see the peaks; a hold mode wherein the highest peak values are held and updated only when new values exceed those previously stored; and an average mode wherein the display is an average of several seconds of information and decays at a slower rate than the peak mode display. An ATTENUATOR switch 78, which includes a rotary thumb wheel and numerical display, permits the scale for the displayed information to be selected in 10 dB steps over a range of from 50 dB to 120 dBSPL (dB's of Sound Pressure Level). The "0" on the display window corresponds to the dBSPL selected in the attenuator window. For example, with the attenuator set at "50 dB", any bars indicating at the "0" line are equal to a level of "50 dBSPL".

An SPL WEIGHTING switch 80 permits selection between two filter functions (A and C) and a flat response. "A" WEIGHTING is intended to match the response of the SPL meter to the human ear at a level of 40 dBSPL at 3 kHz. This setting is preferably used for measurement levels between 30 to 70 dBSPL. "C" WEIGHTING is intended to match the human ear at a level of 90 dBSPL at 3 kHz and should preferably be used for levels above 70 dBSPL. The FLAT setting has no rolloff over the audible frequency range and should only be used for specialized measurements. An SPL RESPONSE switch 82 controls the time constants of an SPL display bar 92. The "fast" and "slow" modes are calibrated to read the rms level of sine waves, while the "peak" mode reads the peak values of the waveforms. The "slow" mode is the normal mode for sound level measurements; however, the "fast" mode may be used with sources having more transient characteristics.

An INPUT switch 84 permits the signal provided to the input selector and attenuator 16 to be selected between the combination of the microphone 12 and the microphone preamplifier 14 for acoustic measurements or the external input connector 17 for electrical measurements. A MODE switch 86 permits the selection between three normal memories, which do not form a part of the present invention, and the difference mode of operation (DIFF) with which the present invention is concerned. Shown on a lower portion of the video display 46 are a plurality of center frequency band indicators 94. Similarly, extending across the width of the video display 46 are a plurality of graticule lines 96 to facilitate reading of the display. An SPL bar 92 located on the righthand portion of the video display 46 indicates the location of the sound pressure level bar.

Referring to FIG. 3, there is a shown a flow chart representing the control inputs entered by a user via the front panel control switch matrix 50 of FIG. 2 for controlling the operation of the audio spectrum analyzer of the present invention. The flow chart represents the operations carried out by the system's microprocessor 32 in response to various user-initiated control inputs for comparing and displaying a current input to the audio spectrum analyzer with reference data previously stored therein. The operating program stored in the microprocessor 32 begins execution of the difference mode of operation at step 100 and, if the MEMORY switch 68 on the front panel control switch matrix 50 is in the DIFF position as determined at step 102, proceeds to step 104 for determining if reference data is stored in the CMOS memory 54. If at step 104 it is determined by the microprocessor 32 that reference data has not yet been stored in the CMOS memory 54, the microprocessor's program enters a control loop for storing reference data in the CMOS memory 54. The program begins this loop by branching to step 106 and displaying a NO REF prompt on the video display 46. The program then proceeds to step 108 in order to determine if STORE has been selected on the STORE/RECALL switch 70 and executes a loop here until this switch is placed in the STORE position. Once the STORE/RECALL switch 70 has been placed in the STORE position and this is detected at step 108, the microprocessor 32 writes the current input from comparator 30 to the display 46 via the display interface 42 and the display controller 44 for display thereon at step 110. Following display of the current input, the program in the microprocessor 32 then determines whether the MEMORY switch 68 has been selected at step 112, and, if selected, proceeds to step 114 for storing the current input in the CMOS memory 54 and displaying a REF prompt momentarily on the video display 46 for indicating that reference data has been stored in the CMOS memory 54. The program then proceeds to step 116 and determines whether the RECALL position of the STORE/RECALL switch 70 has been selected and executes a loop until this switch has been placed in the RECALL position. Once the STORE/RECALL switch 70 has been placed in The RECALL position, the program then again checks to see if reference data has been stored at step 104 and, since this data has been stored in the CMOS memory 54, the program then displays the DIFF prompt at step 118 for indicating that the system is in the difference mode of operation. Next, in response to an output from the comparator 30 representing the difference between the audio signal currently being received and the stored signal spectrum, the microprocessor 32 provides the difference between the stored reference data and the current input to the video display 46 for presentation thereon at step 120. The program then exits the difference mode operating routine at step 122.

Figure 4:
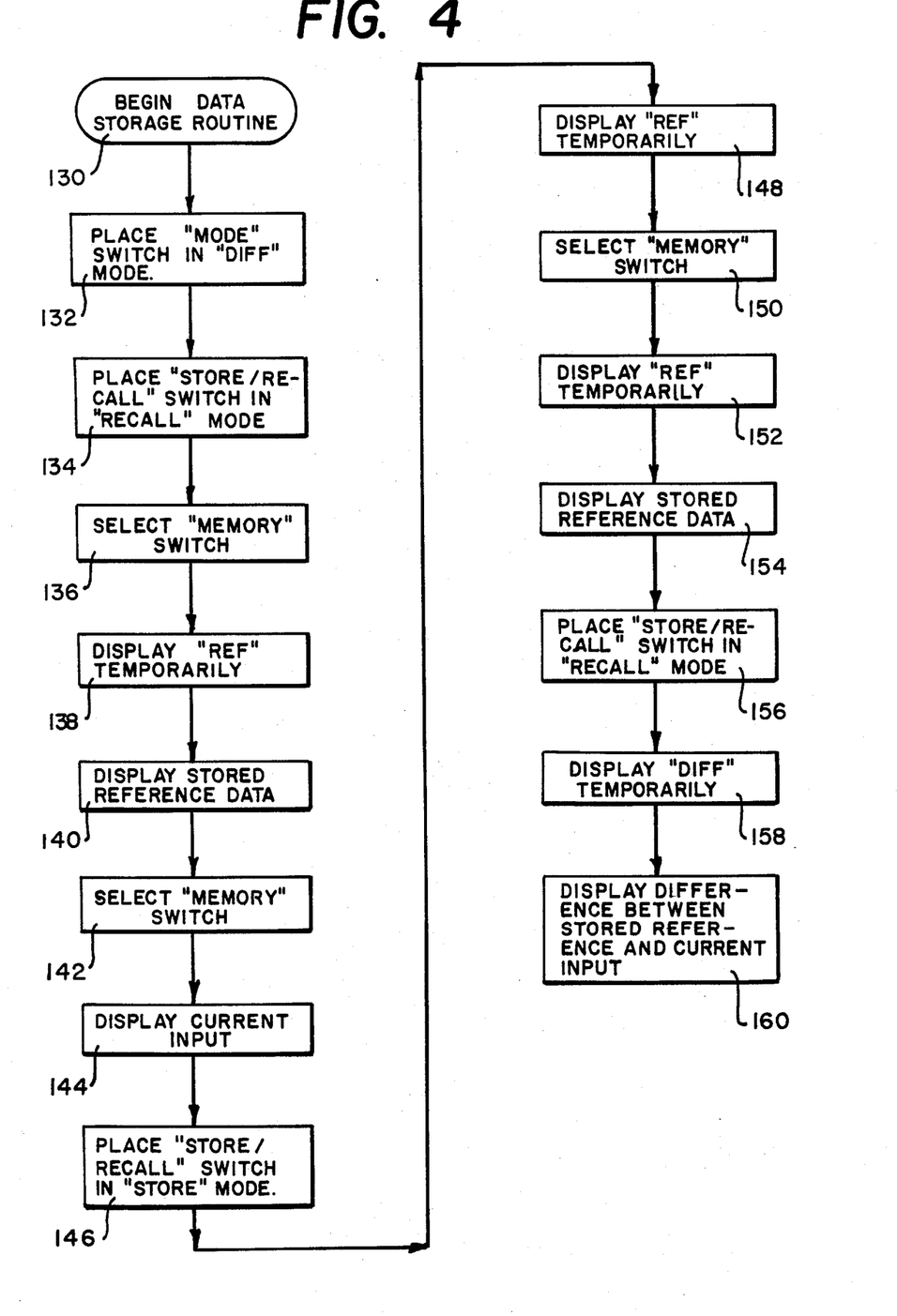

Referring to FIG. 4, there is shown a flow chart representing the operations required for storing a new reference audio signal spectrum in the CMOS memory 54 in accordance with the operating program stored in the microprocessor 32. The data storage routine is initiated at step 130 and initially checks to determine the position of the MODE switch 86. If the MODE switch 86 is in the DIFF position as determined at step 132, the program then determines if the STORE/RECALL switch 70 is in the RECALL mode at step 134. If the STORE/RECALL switch 70 is in the RECALL position, selection of the MEMORY switch 68 as determined at step 136 will cause the REF prompt to be temporarily presented on the video display 46 at step 138.

Following the temporary display of the REF prompt at step 138, the reference data stored in the CMOS memory 54 is displayed by the microprocessor 32 on the video display 46 at step 140. Selection again of the MEMORY switch 68 at step 142 will result in the display of the current input to the video spectrum analyzer at step 144. The program then checks the status of the STORE/RECALL switch 70 and if this switch is in the STORE mode as determined at step 146, the REF prompt is again temporarily displayed at step 148 and will again subsequently be displayed at step 152 if the MEMORY switch 68 is again selected at step 150. Following this third display of the REF prompt at step 152, the reference data stored in the CMOS memory 54 will automatically be displayed at step 154 and the status of the STORE/RECALL switch 70 is then checked by the program at step 156. If the STORE/RECALL switch 70 is in the RECALL position, the program stored in the microprocessor 32 then executes the temporary display of the DIFF prompt on the video display 46 at step 158 and displays the difference between the stored reference spectral data and the currently received input signal to the audio spectrum analyzer at step 160. It is in this manner that a new set of reference data may be stored in the CMOS memory 54 for comparison with a currently received signal.

Figure 5:
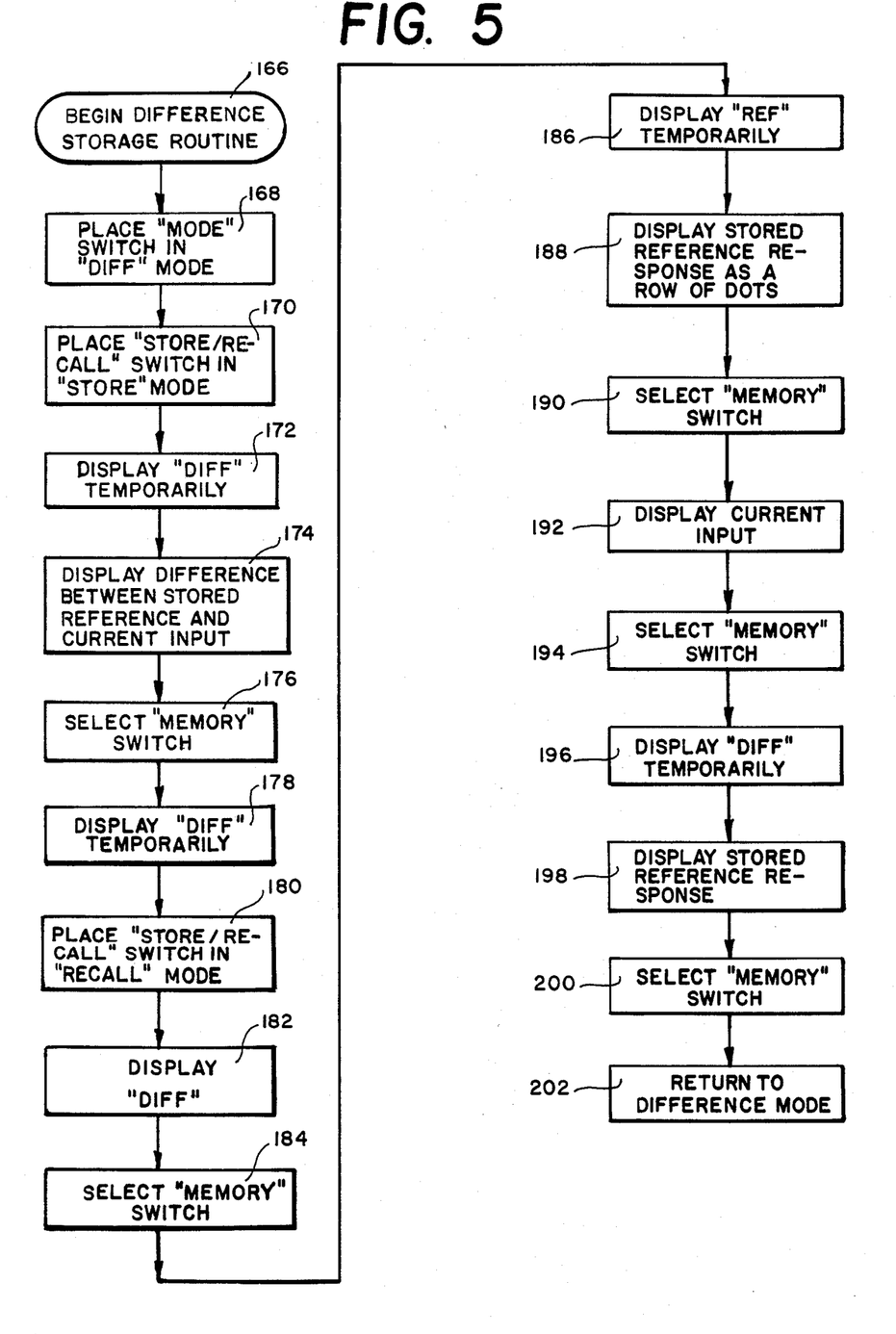

Referring to FIG. 5, there is shown a flow chart representing the operating steps involved in the storing of a difference response of the audio spectrum analyzer in the CMOS memory 54 as carried out by the program stored in the microprocessor 32. This difference response represents the difference between a currently received audio signal and a reference audio spectrum stored in the CMOS memory 54. The difference storage routine is initiated at step 166, with the program stored in the microprocessor 32 initially checking the status of the MODE switch 86 at step 168. If the MODE switch 86 is in the DIFF position, the program then proceeds to step 170 where the status of the STORE/RECALL switch 70 is checked. If the STORE/RECALL switch 70 is in the STORE position, the program executes the temporary display of the DIFF prompt at step 172 and then causes the difference between the stored reference data and the current input to the audio spectrum analyzer to be presented on the video display 46 under the control of microprocessor 32 at step 174. The program then detects the selection of the MEMORY switch 68 at step 176 and causes the DIFF prompt to again be temporarily displayed at step 178. Again, the STORE/RECALL switch 70 is monitored and if it is in the RECALL mode as determined at step 180, the DIFF prompt is again presented on the video display 46 at step 182 and the microprocessor 32 again waits for the selection of the MEMORY switch 68 at step 184. Following selection of the MEMORY switch, the REF prompt is temporarily displayed at step 186 followed by the display of the stored reference response in the form of a row of dots at step 188. If the MEMORY switch 68 is then selected as determined at step 190, the current input to the audio spectrum analyzer is then provided to the video display 46 at step 192 for display thereon. Following yet another selection of the MEMORY switch as determined at step 194, the DIFF prompt is again temporarily displayed at step 196 followed by the display of the reference response stored in the CMOS memory 54 at step 198. Selection of the MEMORY switch 68 at step 200 will cause the program stored in the microprocessor 32 to return to the difference mode of operation at step 202 in exercising control over the audio spectrum analyzer. It is in this manner that a difference response of the audio spectrum analyzer may be stored in its CMOS memory 54 for later recall by microprocessor 32 and display on the video display 46.

There has thus been disclosed a microprocessor-controlled, ⅓-octave, audio spectrum analyzer capable of operating in a difference mode for measuring and visually displaying a comparison between a current audio signal input and a previously stored reference audio spectrum. The present invention permits a reference audio response to be displayed and stored in memory for later comparison in real-time with another audio signal for which a spectrum analysis is desired. Thus, it is not necessary to know or to take into account frequency response errors of either signal source or the audio spectrum analyzer itself because both measurements are made and compared on a relative basis. Several modes of operation are available for storage and recall of various audio signal characteristics for later visual presentation and comparison on a real-time basis.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in the proper perspective based on the prior art.

I claim:

1. An audio spectrum anaylzer for comparing first and second audio signals and for providing a real-time display of the difference spectrum between said first and second audio signals, said analyzer comprising:

receiver means for receiving said first and second audio signals and a third reference audio signal;

memory means for storing the spectrum of a signal provided thereto;

signal processing means coupled to said receiver means and to said memory means for providing said third reference audio signal to said memory means for storing the spectrum of said third reference audio signal therein and for reading said third reference audio signal spectrum therefrom;

comparator means coupled to said receiver means and to said signal processing means for comparing the spectra of said first and second audio signals with the spectrum of said third reference audio signal and for providing to said signal processing means a first difference signal representing the difference between the audio spectra of said first audio signal and said third reference audio signal for storage in said memory means and for subsequent recall therefrom and comparison by said comparator means with a second difference signal representing the difference between the audio spectra of said second audio signal and said third reference audio signal in generating and providing a third difference signal representing the difference between said first and second difference signals to said signal processing means; and display means coupled to said signal processing means and responsive to said third difference signal for displaying the real-time difference spectrum between said first and second audio signals.

2. An audio spectrum analyzer as in claim 1 wherein said receiver means comprises microphone means for receiving an audio signal, signal input means for receiving an electrical signal representing an audio signal, and switch means for coupling either said microphone means or said signal input means to said signal processing means.

3. An audio spectrum analyzer as in claim 1 further comprising a plurality of ½ octave filter and peak detector units coupling said receiver means to said signal processing means.

4. An audio spectrum analyzer as in claim 3 further comprising a plurality of analog multiplexer means for coupling said ½ octave filter and peak detector units to said signal processing means.

5. An audio spectrum analyzer as in claim 3 wherein the energy of said second audio signal is constant within each octave over which the frequency of said second audio signal extends.

6. An audio spectrum analyzer as in claim 1 wherein said audio spectrum analyzer is portable and further comprises a battery coupled to said memory means for preserving the stored contents thereof.

7. An audio spectrum analyzer as in claim 1 wherein said video display comprises a vacuum fluorescent dot matrix display.

* * * * *